(12) United States Patent  (10) Patent No.: US 8,930,606 B2
Stenfort  (45) Date of Patent: Jan. 6, 2015

(54) ORDERING A PLURALITY OF WRITE COMMANDS ASSOCIATED WITH A STORAGE DEVICE

(75) Inventor: Ross John Stenfort, Los Altos, CA (US)

(73) Assignee: LSI Corporation, San Jose, CA (US)

(*) Notice: Subject to any disclaimer, the term of this patent is extended or adjusted under 35 U.S.C. 154(b) by 259 days.

(21) Appl. No.: 13/379,607

(22) PCT Filed: Jul. 2, 2010

(86) PCT No.: PCT/US2010/040855
§ 371 (c)(1),
(2), (4) Date: Dec. 20, 2011

(87) PCT Pub. No.: WO2011/003050
PCT Pub. Date: Jan. 6, 2011

(65) Prior Publication Data
US 2012/0102287 A1 Apr. 26, 2012

Related U.S. Application Data

(63) Continuation-in-part of application No. 12/497,327, filed on Jul. 2, 2009, now abandoned.

(51) Int. Cl.
*G06F 7/10* (2006.01)
*G06F 13/00* (2006.01)
*G06F 3/06* (2006.01)
*H04L 29/08* (2006.01)

(52) U.S. Cl.
CPC .............. *G06F 3/061* (2013.01); *H04L 67/1097* (2013.01); *G06F 3/0659* (2013.01); *G06F 3/0689* (2013.01)
USPC .............................. 710/305; 711/118; 711/167

(58) Field of Classification Search
USPC ......... 710/305–306, 308, 310–311, 313–315; 711/118, 142, 143, 154, 167; 712/207, 712/214, 215, 245; 370/394
See application file for complete search history.

(56) References Cited

U.S. PATENT DOCUMENTS 5,347,648 A  9/1994  Stamm et al.
5,386,552 A  1/1995  Garney
5,485,595 A  1/1996  Assar et al.
(Continued)

FOREIGN PATENT DOCUMENTS

CN   1052740 A   7/1991
CN   1285064 A   2/2001
(Continued)

OTHER PUBLICATIONS

Olson Alan Rand, Denis J Langlois, Solid State Drives Data Reliability and Lifetime, Apr. 7, 2008, Imation.
(Continued)

*Primary Examiner* — Thomas J Cleary
(74) *Attorney, Agent, or Firm* — PatentVentures: Bennett Smith; Korbin Van Dyke (57) ABSTRACT

A system, method, and computer program product are provided for ordering a plurality of write commands associated with a storage device. In operation, a plurality of write commands associated with a storage device to be sent to a device are identified. Additionally, an order of the plurality of write commands is determined, the determined order being known by the device. Further, the plurality of write commands are ordered in the determined order.

20 Claims, 4 Drawing Sheets

(56) References Cited

U.S. PATENT DOCUMENTS

| | | |
|---|---|---|
| 5,519,831 A | 5/1996 | Holzhammer |
| 5,544,356 A | 8/1996 | Robinson et al. |
| 5,568,423 A | 10/1996 | Jou et al. |
| 5,568,626 A | 10/1996 | Takizawa |
| 5,621,687 A | 4/1997 | Doller |
| 5,666,532 A | 9/1997 | Saks et al. |
| 5,675,816 A | 10/1997 | Hiyoshi et al. |
| 5,819,307 A | 10/1998 | Iwamoto et al. |
| 5,835,935 A | 11/1998 | Estakhri et al. |
| 5,881,229 A | 3/1999 | Singh et al. |
| 5,909,591 A | 6/1999 | Brooke |
| 5,956,473 A | 9/1999 | Ma et al. |
| 5,963,970 A | 10/1999 | Davis |
| 6,000,006 A | 12/1999 | Bruce et al. |
| 6,088,701 A | 7/2000 | Whaley et al. |
| 6,154,808 A | 11/2000 | Nagase et al. |
| 6,230,233 B1 | 5/2001 | Lofgren et al. |
| 6,405,295 B1 | 6/2002 | Bando |
| 6,539,453 B1 | 3/2003 | Guterman |
| 6,694,402 B1 | 2/2004 | Muller |
| 6,732,221 B2 | 5/2004 | Ban |
| 6,831,865 B2 | 12/2004 | Chang et al. |
| 6,914,853 B2 | 7/2005 | Coulson |
| 6,925,523 B2 | 8/2005 | Engel et al. |
| 6,948,026 B2 | 9/2005 | Keavs |
| 6,973,531 B1 | 12/2005 | Chang et al. |
| 6,985,992 B1 | 1/2006 | Chang et al. |
| 7,000,063 B2 | 2/2006 | Friedman et al. |
| 7,032,087 B1 | 4/2006 | Chang et al. |
| 7,035,967 B2 | 4/2006 | Chang et al. |
| 7,076,605 B1 | 7/2006 | Son |
| 7,096,313 B1 | 8/2006 | Chang et al. |
| 7,103,732 B1 | 9/2006 | Chang et al. |
| 7,120,729 B2 | 10/2006 | Gonzalez et al. |
| 7,403,130 B2 | 7/2008 | Brucker |
| 7,526,604 B1 * | 4/2009 | Danilak ..................... 711/112 |
| 7,549,013 B2 | 6/2009 | Estakhri et al. |
| 7,653,775 B2 | 1/2010 | Pujol et al. |
| 7,711,897 B1 | 5/2010 | Chatterjee et al. |
| 7,827,320 B1 | 11/2010 | Stevens |
| 8,090,905 B2 | 1/2012 | Stenfort |
| 8,108,737 B2 | 1/2012 | Stenfort |
| 8,140,712 B2 | 3/2012 | Stenfort |
| 2002/0184476 A1 | 12/2002 | McKenney |
| 2003/0074526 A1 | 4/2003 | Kanamaru |
| 2004/0081179 A1 | 4/2004 | Gregorcyk |
| 2005/0102323 A1 | 5/2005 | Henderson et al. |
| 2005/0166014 A1 | 7/2005 | Kobayashi et al. |
| 2006/0004935 A1 | 1/2006 | Seto et al. |
| 2006/0020745 A1 | 1/2006 | Conley et al. |
| 2006/0212655 A1 | 9/2006 | Jeddeloh et al. |
| 2006/0218437 A1 | 9/2006 | Kawa et al. |
| 2006/0265549 A1 | 11/2006 | Chapel et al. |
| 2007/0030734 A1 | 2/2007 | Sinclair et al. |
| 2007/0127366 A1 | 6/2007 | Banks et al. |
| 2007/0273699 A1 | 11/2007 | Sasaki et al. |
| 2008/0005314 A1 | 1/2008 | Kaur et al. |
| 2008/0005398 A1 | 1/2008 | Huffman |
| 2008/0086576 A1 | 4/2008 | Schauer |
| 2008/0151405 A1 | 6/2008 | Kurtas et al. |
| 2008/0155145 A1 | 6/2008 | Stenfort |
| 2008/0168255 A1 | 7/2008 | Abou-Emara et al. |
| 2008/0229045 A1 | 9/2008 | Oi et al. |
| 2008/0294801 A1 | 11/2008 | Matsuda |
| 2008/0294813 A1 | 11/2008 | Gorobets |
| 2008/0307147 A1 | 12/2008 | Biran et al. |
| 2008/0313388 A1 | 12/2008 | Chow et al. |
| 2009/0006787 A1 | 1/2009 | De Souza et al. |
| 2009/0094409 A1 | 4/2009 | Yeh |
| 2009/0164698 A1 | 6/2009 | Ji et al. |
| 2009/0193279 A1 | 7/2009 | Moudgill et al. |
| 2009/0235021 A1 | 9/2009 | Panabaker et al. |
| 2010/0017650 A1 | 1/2010 | Chin |
| 2010/0211744 A1 | 8/2010 | Morrow et al. |
| 2010/0241812 A1 | 9/2010 | Bekoou |
| 2010/0250829 A1 | 9/2010 | Stenfort |
| 2010/0250830 A1 | 9/2010 | Stenfort |
| 2010/0251009 A1 | 9/2010 | Stenfort |
| 2011/0004710 A1 | 1/2011 | Stenfort et al. |
| 2011/0004718 A1 | 1/2011 | Stenfort |
| 2011/0004722 A1 | 1/2011 | Jeddeloh |
| 2011/0016233 A1 | 1/2011 | Stenfort |
| 2011/0016239 A1 | 1/2011 | Stenfort |
| 2011/0022765 A1 | 1/2011 | Stenfort |
| 2011/0041039 A1 | 2/2011 | Harari et al. |
| 2011/0083047 A1 | 4/2011 | Stenfort |
| 2012/0084492 A1 | 4/2012 | Stenfort |
| 2012/0102287 A1 | 4/2012 | Stenfort |

FOREIGN PATENT DOCUMENTS

| | | |
|---|---|---|
| CN | 1516030 A | 7/2004 |
| CN | 1849580 A | 10/2006 |
| JP | H03-230216 A | 10/1991 |
| JP | 2003-122631 A | 4/2003 |
| JP | 2006-251844 A | 9/2006 |
| TW | 200836180 A | 9/2008 |
| TW | 200900926 A | 1/2009 |
| WO | 2004102392 A2 | 11/2004 |
| WO | 2009050644 A1 | 4/2009 |
| WO | WO2010111694 A2 | 9/2010 |
| WO | WO2010111694 A3 | 1/2011 |
| WO | WO2011003050 A2 | 1/2011 |
| WO | WO2011008963 A2 | 1/2011 |
| WO | WO2011011295 A2 | 1/2011 |
| WO | WO2011011562 A2 | 1/2011 |
| WO | WO2010111694 A3 | 4/2011 |
| WO | WO2011008963 A3 | 5/2011 |
| WO | WO2011011295 A3 | 5/2011 |
| WO | WO2011011562 A3 | 5/2011 |

OTHER PUBLICATIONS

Jun. 15, 2012 List of References Used in Art Rejections, 2 pages.
State Intellectual Property Office of P.R.C.. "Notification of the First Office Action", Jan. 6, 2014, in related PRC case serial No. 201080030032.6, 23 pages.
State Intellectual Property Office of P.R.C., "Search Report", Dec. 23, 2013, in related PRC case serial No. 201080030032.6, 4 pages.
Japanese Patent Office , "Notice of Reasons for Refusal", Feb. 18, 2014, in related Japanese case serial No. 2012-519610, 7 pages.
Republic of China (ROC) (Taiwan) "Office Action of the Intellectual Property Office", Sep. 23, 2013, in related ROC case serial No. 099121910, 29 pages.

* cited by examiner

FIGURE 4

ORDERING A PLURALITY OF WRITE COMMANDS ASSOCIATED WITH A STORAGE DEVICE

FIELD OF THE INVENTION

The present invention relates to storage devices, and more particularly to ordering write commands associated with such storage devices.

BACKGROUND

Storage systems may include many devices including storage device and other devices connected to and/or in communication with the storage devices. These devices in communication with the storage devices often need to access commands and/or data associated with the storage devices. In many different types of storage systems, commands are queued and the commands are executed in a random order.

The Serial ATA (SATA) computer bus is one storage-interface for connecting host bus adapters to storage devices such as hard disk drives and optical drives, etc. Currently, in SATA systems and other comparable systems, commands are queued and the order that the commands are executed is random. A device connected to a SATA drive does not have any knowledge as to the order the write commands will be executed.

Thus, the device attached to a SATA drive may not pre-fetch write data unless it has enough resources to pre-fetch write data for all of the commands. Pre-fetching for all commands is very costly because pre-fetching all commands requires the use of a large portion of memory. Additionally, this pre-fetching may not add performance because the command being executed may not necessarily be the command for which data has been pre-fetched. There is thus a need for addressing these and/or other issues associated with the prior art.

SUMMARY

A system, method, and computer program product are provided for ordering a plurality of write commands associated with a storage device. In operation, a plurality of write commands associated with a storage device to be sent to a device are identified. Additionally, an order of the plurality of write commands is determined, the determined order being known by the device. Further, the plurality of write commands are ordered in the determined order.

DETAILED DESCRIPTION

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Figure 1:
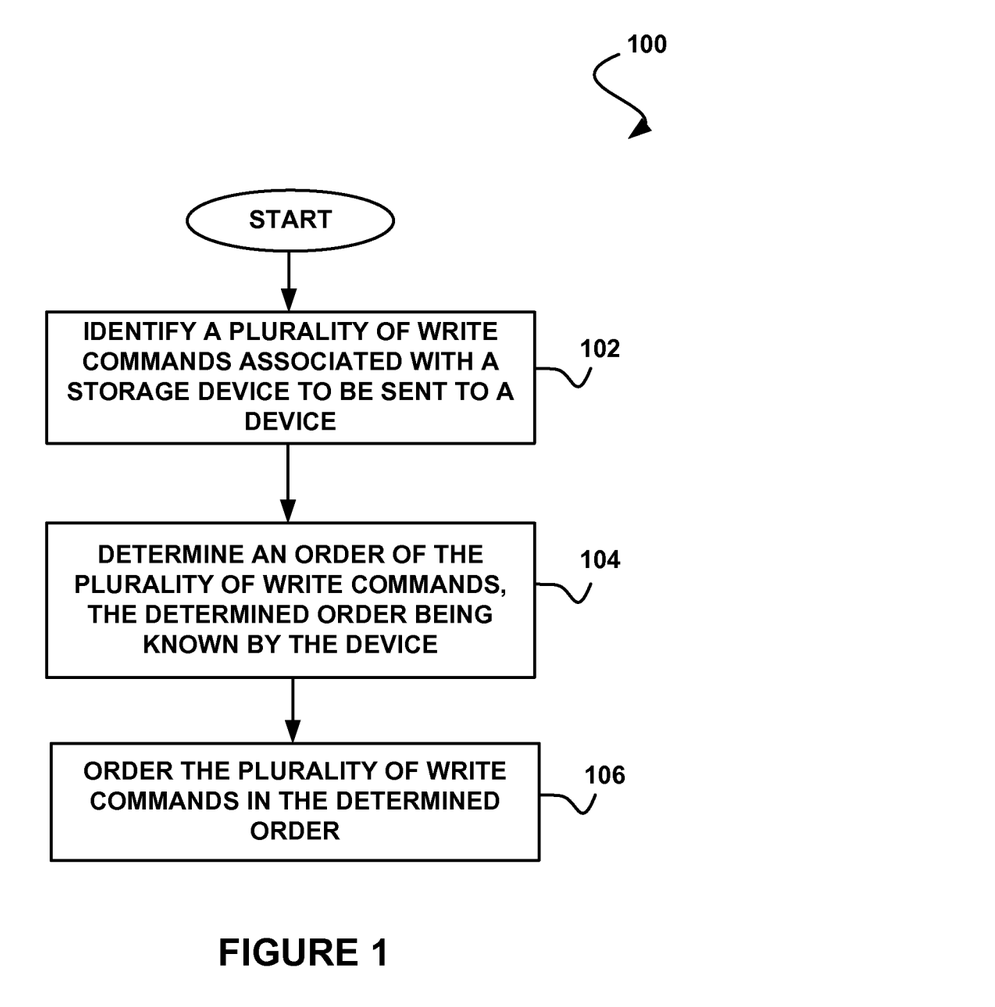
FIG. 1 shows a method for ordering a plurality of write commands associated with a storage device, in accordance with one embodiment.

FIG. 1 shows a method 100 for ordering a plurality of write commands associated with a storage device, in accordance with one embodiment. As shown, a plurality of write commands associated with a storage device to be sent to a device are identified. See operation 102.

In the context of the present description, a storage device refers to any device capable of storing data. For example, in various embodiments, the storage device may include, but is not limited to, a Serial ATA (SATA) drive, a Serial Attached SCSI (SAS) drive, a Fibre Channel (FC) drive, or a Universal Serial Bus (USB) drive, and/or any other storage device. Additionally, in various embodiments, the storage device may include a Peripheral Component Interconnect (PCI) or PCI Express based plug in card configured to appear as a storage device, or a PCI or PCI Express interface configured to appear as a storage device. In one embodiment, a PCI or PCI Express interface may be used to access the storage device.

Further, the write commands may be sent to any type of device capable of receiving commands. For example, in various embodiments, the device may include a host system, an SAS/SATA bridge (e.g. an SAS to SATA bridge, etc.), a USB/SATA bridge (e.g. a USB to SATA bridge, etc.), an FC/SATA bridge (e.g. an FC to SATA bridge, etc.), a PCI or PCI Express based plug in card (e.g. configured to appear as a storage device, etc.), a PCI or PCI Express interface, an interface used to access at least one storage device or system, or any device capable of having a plurality of commands outstanding at one time.

In addition to identifying the write commands associated with the storage device, an order of the plurality of write commands is determined, the determined order being known by the device. See operation 104. In one embodiment, the determined order may be a predetermined order known by the device.

As an option, the order may be determined based on an order in which the write commands are identified (e.g. a first come first served based approach, etc.). For example, as commands are generated and/or received, the commands may be queued. As another option, the order may include a predetermined order known by the device.

Of course, the order may include any order known by the device. In one embodiment, a controller may inform the device of the order. In this case, the order may be determined by the storage device in real time or near real time.

Further, the plurality of write commands are ordered in the determined order. See operation 106. In this case, the storage device may order the plurality of write commands in the determined order.

In this way, the device may be permitted to pre-fetch data associated with the plurality of write commands. In this case, the device may be permitted to pre-fetch the data before an associated write command is executed. This may be accomplished because the device knows the order of the write commands.

In one embodiment, read commands associated with the storage device may also be identified. In this case, the plurality of read commands associated with the storage device may be ordered randomly or in a determined order. In either case, the read commands may be intermixed with the write commands, where the write commands maintain their determined order relative to one another.

Example Embodiments

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1. A method, comprising:
identifying a plurality of write commands associated with a storage device to be sent to a device;
determining an order of the plurality of write commands, the determined order being known by the device; and
ordering the plurality of write commands in the determined order.

EC2. The method of EC1, wherein the determined order is a predetermined order known by the device.

EC3. The method of EC1, wherein the order is determined based on an order in which the plurality of write commands are identified.

EC4. The method of EC1, further comprising permitting the device to pre-fetch data associated with the plurality of write commands.

EC5. The method of EC4, wherein the device is permitted to pre-fetch the data before an associated write command is executed.

EC6. The method of EC1, wherein the identifying, determining, and ordering are performed based on a mode of the storage device.

EC7. The method of EC1, wherein the storage device orders the plurality of write commands in the determined order.

EC8. The method of EC1, wherein the device includes a storage-interface adapter for a host system.

EC9. The method of EC1, wherein the device includes an SAS/SATA bridge.

EC10. The method of EC1, wherein the device includes a USB/SATA bridge.

EC11. The method of EC1, wherein the device includes an FC/SATA bridge.

EC12. The method of EC1, wherein the device includes one of a PCI or PCI Express based plug in card.

EC13. The method of EC1, wherein the device includes one of a PCI or PCI Express interface.

EC14. The method of EC1, wherein the device includes an interface used to access at least one storage device or system.

EC15. The method of EC1, wherein the device includes a device capable of having a plurality of commands outstanding at one time.

EC16. The method of EC1, further comprising identifying a plurality of read commands associated with the storage device.

EC17. The method of EC16, wherein the plurality of read commands associated with the storage device are ordered randomly.

EC18. The method of EC17, wherein the plurality of read commands ordered randomly are intermixed with the plurality of write commands in the determined order.

EC19. The method of EC1, wherein the storage device includes one of a Serial ATA (SATA) drive, a Serial Attached SCSI (SAS) drive, a Fibre Channel (FC) drive, or a Universal Serial Bus (USB) drive.

EC20. The method of EC1, wherein the storage device includes one of a PCI or PCI Express based plug in card configured to appear as a storage device.

EC21. The method of EC1, wherein the storage device includes one of a PCI or PCI Express interface configured to appear as a storage device.

EC22. The method of EC1, wherein a PCI or PCI Express interface is used to access the storage device.

EC23. A computer program product embodied on a computer readable medium, comprising:
computer code for identifying a plurality of write commands associated with a storage device to be sent to a device;
computer code for determining an order of the plurality of write commands, the determined order being known by the device; and
computer code for ordering the plurality of write commands in the determined order.

EC24. An apparatus, comprising:
a storage device for identifying a plurality of write commands associated with the storage device to be sent to a device, and for ordering the plurality of write commands in a determined order, the determined order being known by the device.

EC25. An method, comprising:
processing write commands by a device enabled to communicate with a drive compatible with a storage protocol that permits command execution in random order, each write command having associated write data;
the device fetching the write data associated with at least some of the write commands, the device sending the fetched data to the drive;
performing the fetching of the associated write data in a same particular order as the executing of the write commands by the drive; and
wherein the device is enabled to fully utilize all available write data storage for the associated write data next fetched.

EC26. The method of EC25, wherein the device first encounters the write commands in a sequence other than the particular order.

EC27. The method of EC25, wherein with respect to the drive the device functions as a host bus adapter or a bridge.

EC28. The method of EC25, further comprising:
the device sending the write commands to the drive in a particular sequence; and
wherein the particular order is established by and the same as the particular sequence.

EC29. The method of EC25, wherein the storage protocol is Serial ATA (SATA) compatible.

EC30. The method of EC25, wherein the drive is a solid-state drive (SSD).

EC31. The method of EC25, wherein the drive is enabled to execute non-write commands in an order independent of the particular order and intermixed with the execution of the write commands.

EC32. An apparatus, comprising:
means for communicating with a drive compatible with a storage protocol that permits command execution in random order;
means for processing write commands, each write command having associated write data;
means for fetching the write data associated with at least some of the write commands;
means for sending the fetched data to the drive;
means for performing the fetching of the associated write data in a same particular order as the executing of the write commands by the drive; and
wherein the device is enabled to fully utilize all available write data storage for the associated write data next fetched.

EC33. The apparatus of EC32, wherein the apparatus first encounters the write commands in a sequence other than the particular order.

EC34. The apparatus of EC32, wherein the apparatus is an initiator or a bridge.

EC35. The apparatus of EC32, further comprising:
means for sending the write commands to the drive in a particular sequence; and
wherein the particular order is established by and the same as the particular sequence.

EC36. The apparatus of EC32, wherein the storage protocol is Serial ATA (SATA) compatible.

EC37. The apparatus of EC32, wherein the drive is a solid-state drive (SSD).

EC38. The apparatus of EC32, wherein the drive is enabled to execute non-write commands in an order independent of the particular order and intermixed with the execution of the write commands.

EC39. A tangible computer readable medium having a set of instructions stored therein which when executed by a computer causes the computer to perform functions comprising:
processing write commands by a device enabled to communicate with a drive compatible with a storage protocol that permits command execution in random order, each write command having associated write data;
the device fetching the write data associated with at least some of the write commands, the device sending the fetched data to the drive;
performing the fetching of the associated write data in a same particular order as the executing of the write commands by the drive; and
wherein the device is enabled to fully utilize all available write data storage for the associated write data next fetched.

EC40. The tangible computer readable medium of EC39, wherein the device first encounters the write commands in a sequence other than the particular order.

EC41. The tangible computer readable medium of EC39, wherein the device is a selected one of a host bus adapter and a bridge.

EC42. The tangible computer readable medium of EC39, wherein the processing write commands comprises at least one of generating the write commands and receiving the write commands.

EC43. The tangible computer readable medium of EC39, wherein the storage protocol is Serial ATA (SATA) compatible.

EC44. The tangible computer readable medium of EC39, wherein the drive is a solid-state drive (SSD).

EC45. The tangible computer readable medium of EC39, wherein the drive is enabled to execute non-write commands in an order independent of the particular order and intermixed with the execution of the write commands.

EC46. The tangible computer readable medium of EC39, wherein the stored set of instructions when executed by the computer causes the computer to perform further functions comprising:
the device sending the write commands to the drive in a particular sequence; and
wherein the particular order is established by and the same as the particular sequence.

EC47. An apparatus, comprising:
a storage-interface enabled to communicate with a drive compatible with a storage protocol that permits command execution in random order;
a queue enabled to temporarily hold write commands, each write command having associated write data;
control logic to fetch the write data associated with at least some of the write commands and to send the fetched data to the drive; and
wherein the control logic is enabled to perform the fetching of the associated write data in a same particular order as the executing of the write commands by the drive, and is further enabled to fully utilize all available write data storage for the associated write data next fetched.

EC48. The apparatus of EC47, wherein the apparatus first encounters the write commands in a sequence other than the particular order.

EC49. The apparatus of EC47, wherein the particular order is communicated to the apparatus by the drive.

EC50. The apparatus of EC47, wherein each of the apparatus and the drive are pre-configured to use the particular order.

EC51. The apparatus of EC47, wherein the particular order is determined in at least one of the apparatus and the drive via selection of at least one mode of operation.

EC52. The apparatus of EC47, wherein the particular order is first-come first-served.

EC53. The apparatus of EC47, wherein at least one of the apparatus and the drive always use the particular order.

EC54. The apparatus of EC47, wherein the apparatus functions as a host bus adapter with respect to the drive.

EC55. The apparatus of EC47, wherein the apparatus functions as a bridge with respect to the drive.

EC56. The apparatus of EC47, wherein the storage protocol is Serial ATA (SATA) compatible.

EC57. The apparatus of EC47, wherein the drive is a solid-state drive (SSD).

EC58. The apparatus of EC47, wherein the drive is enabled to execute non-write commands in an order independent of the particular order and intermixed with the execution of the write commands.

EC59. The apparatus of EC47, wherein the apparatus at least generates the write commands.

EC60. The apparatus of EC47, wherein the apparatus at least receives the write commands.

EC61. The apparatus of EC47, wherein the control logic is further enabled to send the write commands to the drive in a particular sequence, and the particular order is established by and the same as the particular sequence.

EC62. The apparatus of EC47, wherein the write commands temporarily held in the queue are held in a particular sequence, the control logic is further enabled to send the write commands to the drive in the particular sequence, and the particular order is established by and the same as the particular sequence.

Further Features

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
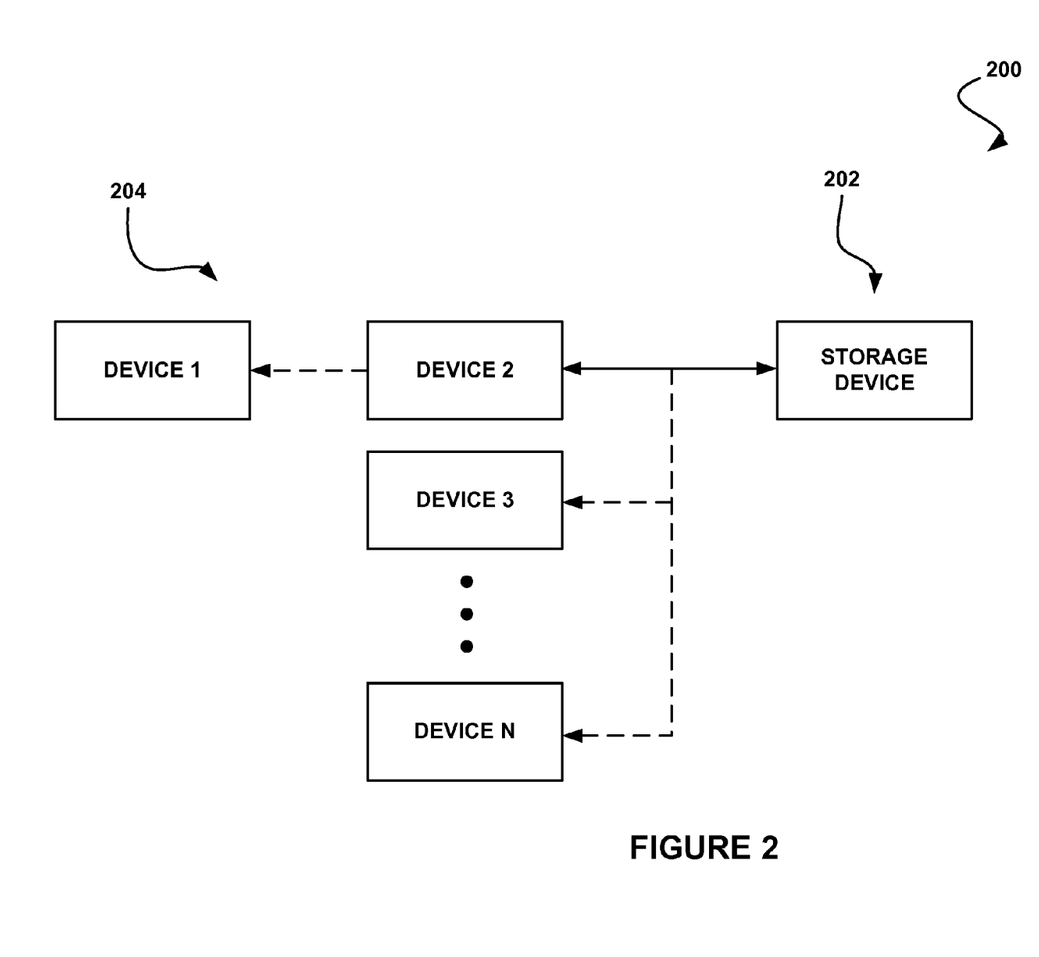
FIG. 2 shows a system for ordering a plurality of write commands associated with a storage device, in accordance with one embodiment.

FIG. 2 shows a system 200 for ordering a plurality of write commands associated with a storage device, in accordance with one embodiment. As an option, the present system 200 may be implemented to carry out the method 100 of FIG. 1. Of course, however, the system 200 may be implemented in any desired environment. It should also be noted that the aforementioned definitions may apply during the present description.

As shown, the system 200 includes a storage device 202. As shown further, one or more devices 204 are in communication with and/or connected to the storage device 202. This communication and/or connection may be accomplished utilizing any type of bus, etc.

In this case, the storage device 202 may represent any number of storage devices. For example, in various embodiments, the storage device 202 may represent a SATA drive, an SAS drive, an FC drive, a USB drive, a PCI or PCI Express based plug in card configured to appear as a storage device, and/or any other storage device.

Furthermore, the one or more devices 204 may include any device capable of receiving commands. For example, in various embodiments, the devices 204 may include an SAS/SATA bridge, a USB/SATA bridge, an FC/SATA bridge, a PCI or PCI Express based plug in card, an expander, and initiator, and/or any other device.

In operation, the storage device 202 may identify write commands associated with the storage device 202 to be sent to one or more of the devices 204. The storage device 202 may then determine an order. In various embodiments, this determination may be made in real time or near real time, or may be a predetermined order.

The storage device 202 may then order the write commands in a determined order, where the determined order is known by the devices 204. In one embodiment, the storage device 202 may order the write commands by placing the write commands in a queue in the order. In another embodiment, the storage device 202 may order the write commands by assigning an order to the write commands.

In one embodiment, the identifying, determining, and ordering may be performed based on a mode of the storage device 202. For example, a mode may indicate that a particular ordering is to be performed and/or utilized. In another embodiment, the identifying, determining, and ordering may be performed as a standard function.

In one embodiment, a plurality of read commands associated with the storage device 202 may also be identified. In this case, the plurality of read commands associated with the storage device 202 may be ordered randomly. Further, the plurality of read commands ordered randomly may be intermixed with the plurality of write commands in the determined order.

In this way, the devices 204 may be permitted to pre-fetch data associated with the write commands. In this case, the devices 204 may be permitted to pre-fetch the data before an associated write command is executed. This may be accomplished because the devices 204 know the order of the write commands.

For example, in some systems, a device (e.g. a host/bridge, etc.) attached to a SATA drive may not know the order of the write commands. Thus, the drive can not pre-fetch write data unless it has enough resources to pre-fetch write data for all the commands. However, pre-fetching for all commands may be very costly since this costs a large portion of memory.

As an option, a hard disk drive (HDD) may reorder the commands to reduce the number of rotations of the media needed to fetch all the data. Additionally, a solid-state drive (SSD) may reorder the commands based on the internal architectures to optimize for the drive. However, in some cases, the host/bridge attached to the drive that needs to fetch write data may be a bottle neck.

Thus, the drive may order the commands in a deterministic fashion which is known by the host and/or bridge. In one embodiment, this may be implemented as a first come first served approach. Thus, the host will know the order of the write commands and it may pre-fetch write data before the command is executed. In various embodiments, the drive may always perform this ordering, or the ordering may be based on a mode. As an option, there may be more than one mode.

Additionally, the ordering may be implemented for any protocol or mode within a protocol that does not have a deterministic technique of ordering the commands relative to one another. It should be noted that the order of the read commands may or may not be deterministic relative to the order of the write commands.

For example, many read and write commands may be received. The read commands may be ordered randomly and the write commands may be ordered deterministically. The read and write commands may be intermixed, where the relative order of the write commands to one another is maintained. It should also be noted that, in one embodiment, a memory controller (e.g. an SSD controller, etc.) may pass information about the order of write commands to the device attached to the drive to allow for efficient pre-fetching.

Figure 3:
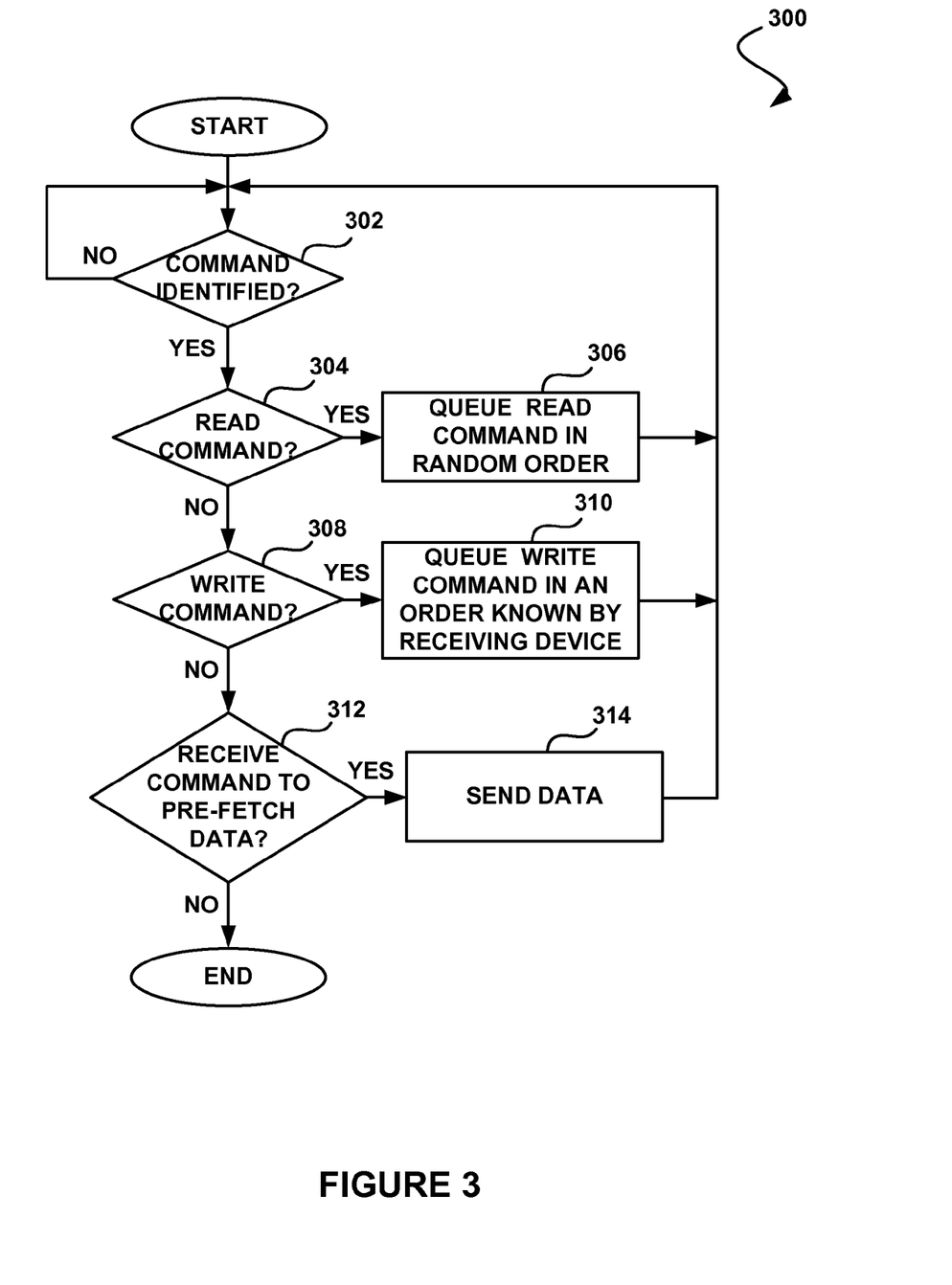
FIG. 3 shows a method for ordering a plurality of write commands associated with a storage device, in accordance with another embodiment.

FIG. 3 shows a method 300 for ordering a plurality of write commands associated with a storage device, in accordance with another embodiment. As an option, the present method 300 may be implemented in the context of the functionality and architecture of FIGS. 1-2. Of course, however, the method 300 may be carried out in any desired environment. Again, the aforementioned definitions may apply during the present description.

As shown, it is determined whether a command is identified. See operation 302. If a command is identified, it is determined whether the command is a read command. See operation 304.

If the command is a read command, the read command is queued in a random order. See operation 306. If the command is not a read command, it is determined if the command is a write command. See operation 308.

If the command is a write command, the command is queued in an order known to a receiving device. See operation 310. For example, in one embodiment, the write command may be queued in an order and then the receiving device may be informed as to the order. In another embodiment, the write command may be queued in a predetermined order already known by the receiving device.

It is then determined whether a command to pre-fetch data is received from a receiving device. See operation 312. If a command to pre-fetch data is received, the data is sent. See operation 314.

In one embodiment, a SATA drive may execute write commands in the same order that a host, bridge, or attached device sends the commands. The host, bridge, or attached device may then pre-fetch data based on knowing the order the write commands will be executed. Thus, all available write data storage may be used for the next data.

In this way, performance may be greatly increased since the write data may be pre-fetched before the device is ready for the write data. In one embodiment, an SSD controller may pass information about the order of write commands to the device attached to allow for efficient pre-fetching.

Figure 4:
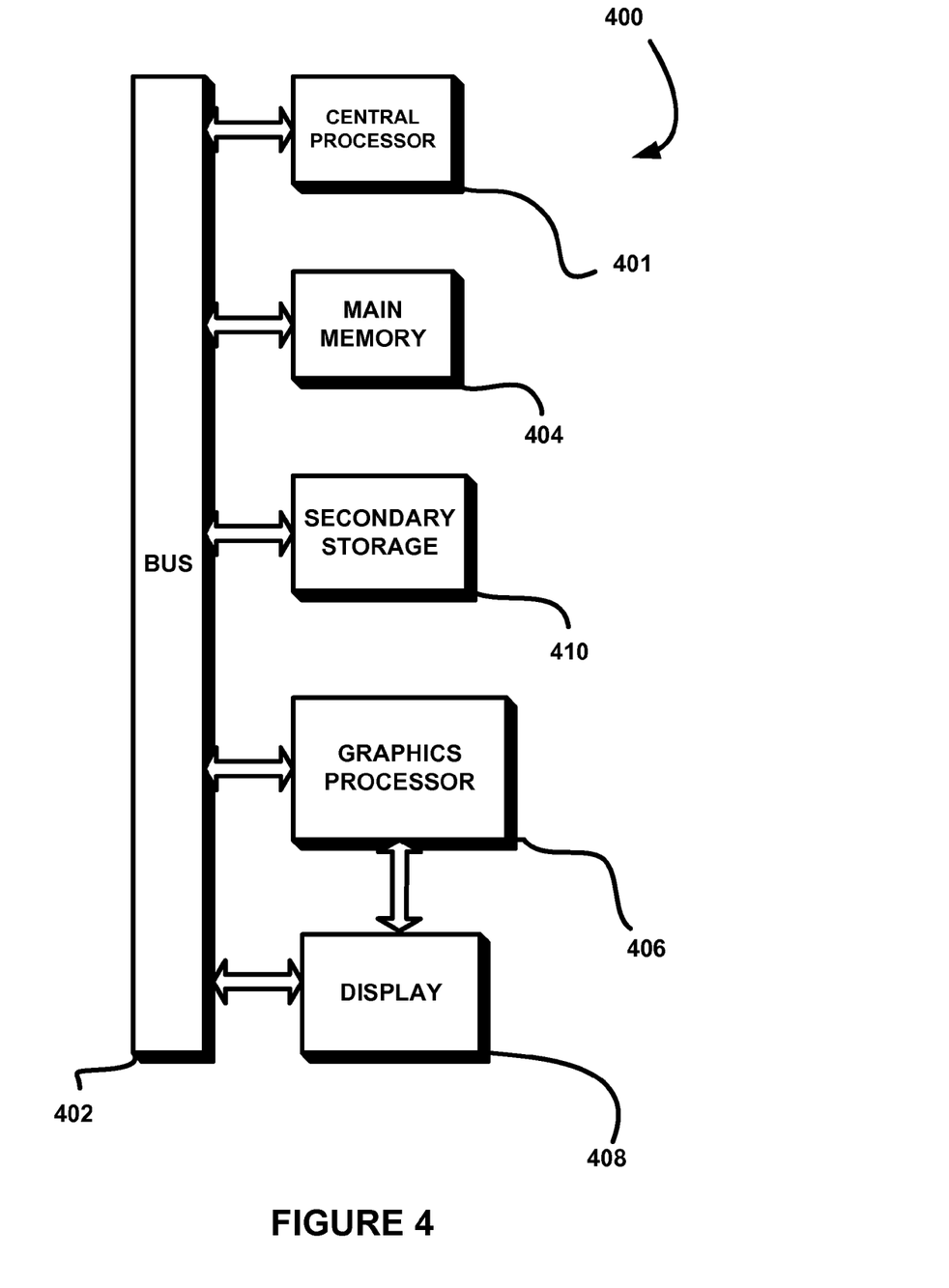
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, lap-top computer, and/or any other type of logic. Still yet, the system 400 may take the form of various other devices including, but not limited to, a personal digital assistant (PDA) device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.] for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Conclusion

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as flash memory technology types; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. An apparatus, comprising:
   a storage-interface enabled to communicate with a drive compatible with a storage protocol enabling command execution in random order;
   a queue enabled to temporarily hold write commands, each write command having associated write data;
   control logic to fetch the write data associated with at least some of the write commands and to send the fetched data to the drive;
   wherein the control logic is enabled to perform the fetching of the associated write data in a same particular order as the executing of the write commands by the drive, and is further enabled to perform at least some of the fetching before at least some of the executing; and
   wherein the particular order is communicated to the apparatus by the drive.

2. The apparatus of claim 1, wherein the apparatus first encounters the write commands in a sequence other than the particular order.

3. The apparatus of claim 1, wherein the particular order is determined in real time.

4. The apparatus of claim 1, wherein each of the apparatus and the drive are pre-configured to use the particular order.

5. The apparatus of claim 1, wherein the particular order is determined in the drive via selection of at least one mode of operation.

6. The apparatus of claim 1, wherein the particular order is first-come first-served.

7. The apparatus of claim 1, wherein at least one of the apparatus and the drive always use the particular order.

8. The apparatus of claim 1, wherein the apparatus functions as a host bus adapter with respect to the drive.

9. The apparatus of claim 1, wherein the apparatus functions as a bridge with respect to the drive.

10. The apparatus of claim 1, wherein the storage protocol is Serial ATA (SATA) compatible.

11. The apparatus of claim 1, wherein the drive is a solid-state drive (SSD).

12. The apparatus of claim 1, wherein the drive is enabled to execute non-write commands in an order independent of the particular order and intermixed with the execution of the write commands.

13. The apparatus of claim 1, wherein the apparatus at least generates the write commands 14. The apparatus of claim 1, wherein the apparatus at least receives the write commands 15. The apparatus of claim 1, wherein the control logic is further enabled to send the write commands to the drive in a particular sequence, and the particular order is established by and the same as the particular sequence.

16. The apparatus of claim 1, wherein the write commands temporarily held in the queue are held in a particular sequence, the control logic is further enabled to send the write commands to the drive in the particular sequence, and the particular order is established by and the same as the particular sequence.

17. The apparatus of claim 1, further comprising write data storage, and wherein the control logic is further enabled to fully utilize all available portions of the write data storage for the associated write data next fetched.

18. The apparatus of claim 1, wherein the particular order is other than first-come first-served.

19. The apparatus of claim 1, wherein the drive is a hard disk drive (HDD) and the particular order comprises a reordering to enable reducing a number of media rotations in the HDD.

20. The apparatus of claim 1, wherein the drive is a sold-state drive (SSD) and the particular order comprises a reordering to optimize for internal architectures of the SSD.

* * * * *